(12) United States Patent
Peet

(10) Patent No.: US 8,661,626 B2
(45) Date of Patent: Mar. 4, 2014

(54) CIRCUMFERENTIAL CLAMP AND LATCHING ASSEMBLY

(75) Inventor: Steven E Peet, Bristol (GB)

(73) Assignee: Rolls-Royce PLC, London (GB)

( * ) Notice: Subject to any disclaimer, the term of this patent is extended or adjusted under 35 U.S.C. 154(b) by 195 days.

(21) Appl. No.: 13/216,620

(22) Filed: Aug. 24, 2011

(65) Prior Publication Data

US 2012/0073091 A1     Mar. 29, 2012

(30) Foreign Application Priority Data

Sep. 24, 2010   (GB) .................................. 1016016.6

(51) Int. Cl.
*F16B 2/10*      (2006.01)
*F16B 7/04*      (2006.01)

(52) U.S. Cl.
USPC .................................. 24/285; 24/269; 24/280

(58) Field of Classification Search
USPC .......... 24/19, 269, 274 P, 279, 280, 284, 285, 24/519; 403/315
See application file for complete search history.

(56) References Cited

U.S. PATENT DOCUMENTS

| | | | | | |
|---|---|---|---|---|---|
| 1,687,340 | A | * | 10/1928 | Little | 425/393 |
| 2,189,172 | A | * | 2/1940 | Hathorn | 24/274 R |
| 2,635,319 | A | * | 4/1953 | Skelly | 24/279 |
| 2,752,174 | A | * | 6/1956 | Frost | 285/409 |
| 2,775,806 | A | * | 1/1957 | Love | 24/271 |
| 3,164,401 | A | * | 1/1965 | Fawkes | 285/229 |
| 3,233,922 | A | * | 2/1966 | Evans | 285/236 |
| 3,267,547 | A | * | 8/1966 | Morriss, Jr. | 24/279 |
| 3,359,017 | A | * | 12/1967 | Schaub | 285/236 |
| 3,600,770 | A | * | 8/1971 | Halling | 24/279 |
| 3,762,743 | A | * | 10/1973 | Hawle | 285/197 |
| 3,848,638 | A | * | 11/1974 | Huslander et al. | 138/99 |
| 4,123,095 | A | * | 10/1978 | Stehlin | 285/409 |
| 4,381,020 | A | * | 4/1983 | Daghe et al. | 138/99 |
| 4,739,542 | A | * | 4/1988 | Krzesicki | 24/285 |
| 4,919,453 | A | * | 4/1990 | Halling et al. | 285/3 |
| 5,137,305 | A | | 8/1992 | Straub | |
| 5,454,606 | A | * | 10/1995 | Voss et al. | 285/367 |
| 5,509,702 | A | * | 4/1996 | Warehime et al. | 285/409 |

(Continued)

FOREIGN PATENT DOCUMENTS

| | | |
|---|---|---|
| EP | 0 493 211 A1 | 7/1992 |
| EP | 2 233 752 A1 | 9/2010 |
| GB | 2 050 491 A | 1/1981 |
| GB | 2 253 020 A | 8/1992 |

OTHER PUBLICATIONS

Search Report issued in British Application No. GB1016016.6 dated Jan. 20, 2011.

*Primary Examiner* — Robert J Sandy
*Assistant Examiner* — Caroline L Natirboff
(74) *Attorney, Agent, or Firm* — Oliff PC

(57) ABSTRACT

A circumferential clamp (2) including a clamping band (4) having oppositely disposed circumferential ends (8, 10) and a latching assembly (6) for securing the ends (8, 10) together. The latching assembly (6) includes first and second latching devices (12, 14), each of which includes an elongate element (16, 26, 28) which is pivotably mounted on the clamping band (4) adjacent one of the ends (8, 10) and is engageable with the clamping band (4) adjacent the other end to latch the ends (8, 10) together. The lengthwise axes of the elongate elements (16, 26, 28) lie in, or intersect, a common plane tangential to the clamping band (4), and may be coincident with, or intersect, each other.

5 Claims, 4 Drawing Sheets

(56) References Cited

U.S. PATENT DOCUMENTS

| | | | |
|---|---|---|---|
| 5,513,228 A * | 4/1996 | Malmasson | 376/203 |
| 5,522,625 A * | 6/1996 | Flick et al. | 285/409 |
| 6,796,004 B2 * | 9/2004 | Belisle et al. | 24/279 |
| 2008/0164691 A1 * | 7/2008 | Meinig | 285/18 |
| 2010/0083473 A1 * | 4/2010 | Mieszelewicz | 24/279 |
| 2012/0068453 A1 * | 3/2012 | Peet | 285/81 |

* cited by examiner

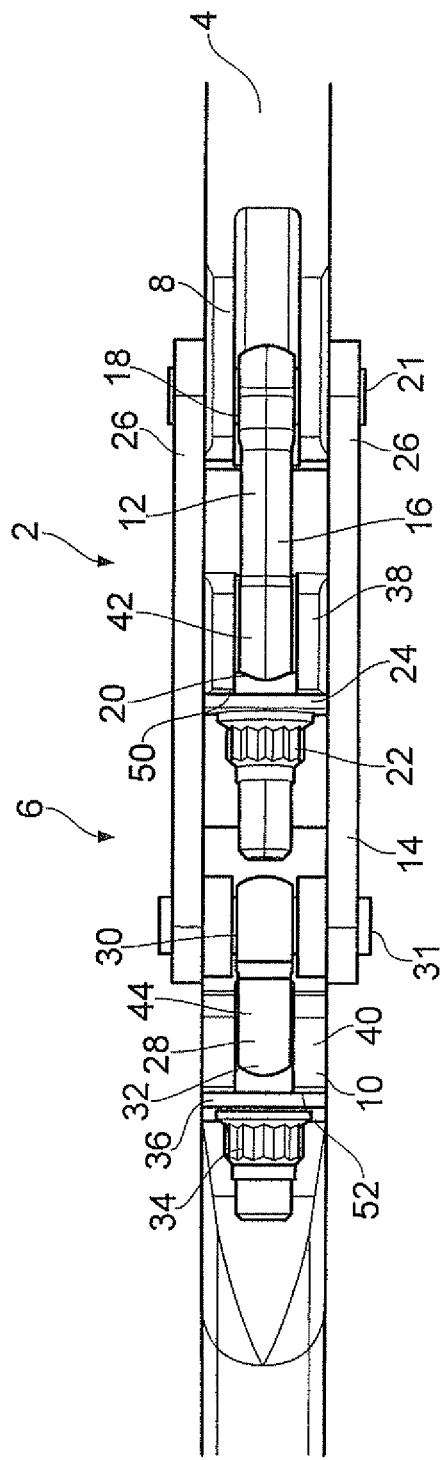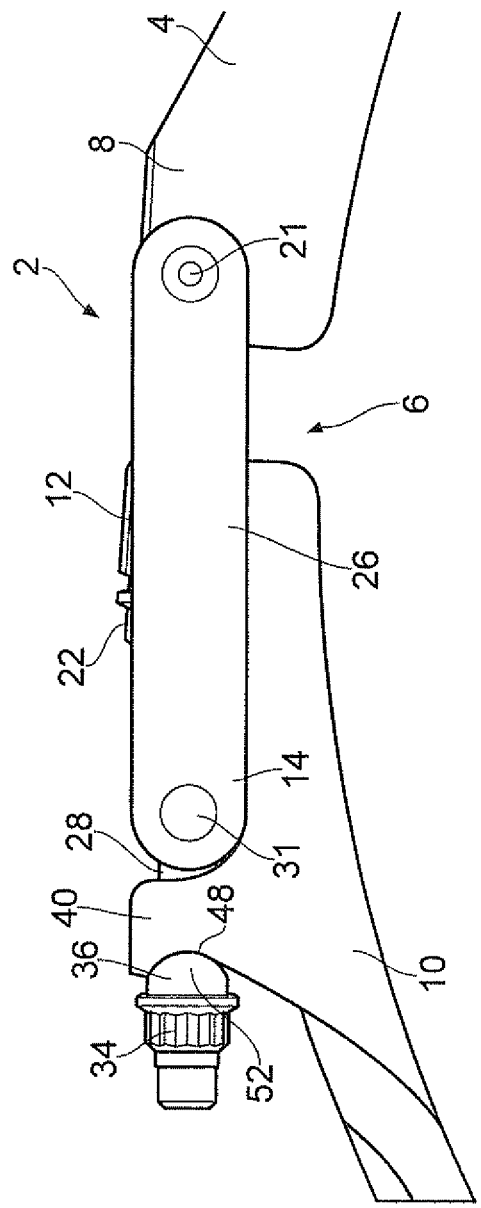

CIRCUMFERENTIAL CLAMP AND LATCHING ASSEMBLY

BACKGROUND

This invention relates to a circumferential clamp and a latching assembly.

It is known to use circumferential clamps to secure axially aligned parts together, for example high pressure and high temperature ducting in engine bleed systems. Circumferential clamp couplings typically comprise a pair of hinged jaws which clamp about respective flanges at the ends of the parts to be clamped together. The jaws are secured together at their free ends by a latch, for example fastener such as a bolt pivotally mounted to one of the jaws which latches over the end of the opposite jaw. Once latched, the jaws are clamped together by tightening the latch. In safety critical applications it is often necessary to provide a redundant latch to keep the clamp closed in the event of failure of the primary fastener. The redundant latch is disposed adjacent to and radially outward (with respect to the center of the clamp) of the primary fastener. This arrangement is bulky and occupies a large amount of radial space outwardly of the clamp. Furthermore, the moment generated by the radially outer redundant latch about the center of the clamp is greater than that of the primary latch, and so produces high stresses in the clamp. A further disadvantage associated with this arrangement is that it is possible to access, and so further tighten, the redundant fastener once the primary fastener has been tightened with the consequence that the fasteners can be alternately tightened putting progressively more stress into the coupling.

BRIEF SUMMARY

According to a first aspect of the invention there is provided a circumferential clamp comprising a clamping band having oppositely disposed circumferential ends and a latching assembly for securing the ends together, the latching assembly comprising first and second latching devices, each of which comprises an elongate element which is pivotably mounted on the clamping band adjacent one of the ends and is engageable with the clamping band adjacent the other end to latch the ends together, the lengthwise axes of the elongate elements lying in, or intersecting, a common plane tangential to the clamping band.

The lengthwise axes of the elongate elements may be coincident with, or intersect, each other.

The elongate elements of the first and second latching devices may be mounted on the clamping band to pivot about a common axis.

The second latching device may obstruct access to the first latching device when the ends of the clamping band are latched together by the first and second latching devices.

The second latching device may comprise at least one linkage which is offset from the lengthwise axis of the second latching device so as to accommodate the first latching device.

The or each linkage may comprise a plurality of stacked plate links, each plate link extending parallel to the lengthwise axis of the second latching device.

The first latching device may be disposed between plate links of the linkage when the ends of the clamping band are latched together by the first and second latching devices.

According to a second aspect of the invention there is provided a latching assembly for securing two components together, the latching assembly comprising first and second latching devices, each of which comprises an elongate element which is pivotably mounted to one of the components and is engagable with the other component to latch the components together, the lengthwise axes of the elongate elements being coincident with, or intersecting, each other.

BRIEF DESCRIPTION OF THE DRAWINGS

For a better understanding of the present invention, and to show more clearly how it may be carried into effect, reference will now be made, by way of example, to the accompanying drawings, in which:

FIG. 2 is a partial radial view of the circumferential clamp shown in FIG. 1;

FIG. 3 is a partial axial view of the circumferential clamp shown in FIG. 1;

DETAILED DESCRIPTION

Figure 1:
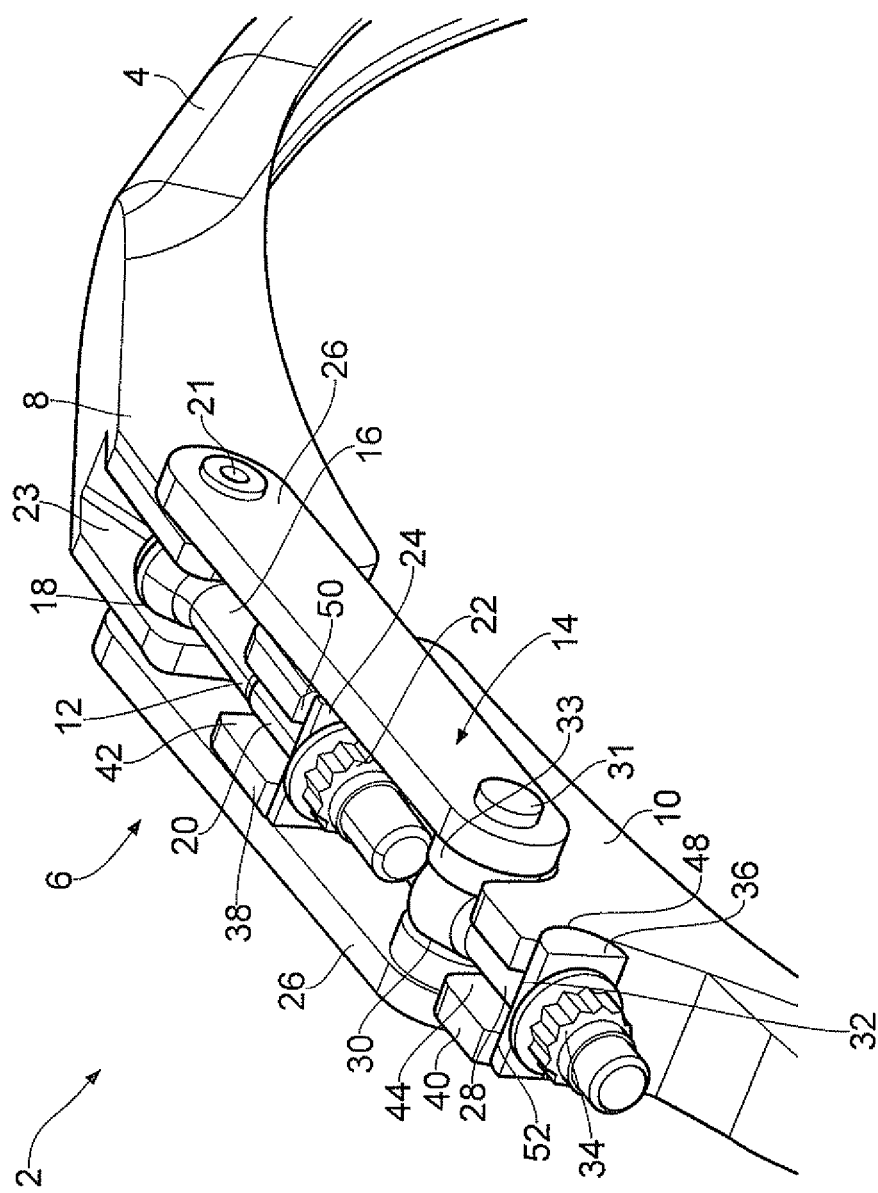
FIG. 1 is a partial perspective view of a circumferential clamp comprising a latching assembly.

FIG. 1 shows part of a circumferential clamp 2 comprising a clamping band 4 and a latching assembly 6. The latching assembly 6 is shown fully latched. The clamping band 4 is shown only in part. It will be appreciated that the clamping band 4 extends in a complete loop, thereby defining a longitudinal axis about which the clamping band 4 clamps.

The clamping band 4 has two oppositely disposed first and second circumferential ends 8, 10 which are secured together by the latching assembly 6.

The latching assembly 6 comprises a first latching device 12 and a second latching device 14.

The first latching device 12 comprises a first eyebolt 16 having an eye 18 (not visible) at one end, a threaded section 20 towards the other end and a threaded fastener 22 having a non-circular profile, for example a nut, engaged with the threaded section 20. The lengthwise axis of the first eyebolt 16 defines the lengthwise axis of the first latching device 12. The first latching device 12 further comprises a semi-cylindrical washer 24 having a convex surface and a flat surface (for example a barrel-type washer such as a saddle washer) arranged about the shank of the eyebolt 18 between the threaded fastener 22 and the eye 18.

The first latching device 12 is secured to the first circumferential end 8 by a clevis arrangement comprising a pin 21 which extends across a recess 23 in the first circumferential end 8 of the clamping band 4 and through the eye 18 of the first eyebolt 16. The pin 21 extends through the walls of the recess 23 and in a direction which is parallel to the longitudinal axis of the clamping band 4. The pin 21 can rotate with respect to the walls of the recess 23 and the eyebolt 16. The pin 21 is held in place by circlips, crimped washers, swaged ends, steps or other suitable means. The clevis arrangement permits the first latching device 12 to pivot in a plane which is perpendicular to the longitudinal axis of the clamping band 4.

The second latching device 14 comprises two parallel elongate links 26 connecting a second eyebolt 28 to the first circumferential end 8, a second threaded fastener and a second semi-cylindrical washer 36.

Each link 26 is secured to the respective ends of the pin 21 which extend through, and protrude from, the walls of the recess 23. The links 26 are therefore pivotally connected to the first circumferential end 8 on opposite sides of the clamping band 4. The links 26 are arranged to pivot independently of the first latching device 12 in respective planes that are parallel to the plane in which the first latching device 12 pivots.

The second eyebolt 28 is secured to the free ends of the links 26 by a further clevis arrangement comprising a second pin 31 passing through the free ends of the links 26 and an eye 30 (not visible) of the second eyebolt 28. The pin 31 can rotate with respect to the links 26. The pin 31 is held in place by means similar to that used for the pin 21. The second eyebolt 28 is pivotable about the pin 31 with respect to the links 26. Spacers 33 are disposed between the links 26 and the eyebolt 28 to centralise the eyebolt 28 between the links 26.

The second eyebolt 28 has a threaded section 32 (not visible) towards the end opposite the eye 30 and a threaded fastener 34 having a non-circular profile, for example a nut, is engaged with the threaded section 32. The semi-cylindrical washer 36 is similar to that of the first fastening device 12, and is arranged about the shank of the bolt between the threaded fastener 34 and the eye 30.

The second latching device 14 has a lengthwise axis which is defined midway between the links 26 and lies parallel to the links 26. The lengthwise axis of the second latching device 14 intersects the pivot axis defined by the pin 21. In the latched configuration of FIG. 1, the lengthwise axis of the second eyebolt 28 coincides with the lengthwise axis of the second latching device 14.

The second circumferential end 10 of the clamping band 4 has first and second engaging portions 38, 40 which jut away from the clamping band 4 in a radially outward direction. Respective slots 42, 44 extend in the circumferential direction through each of the engaging portions 38, 40. The widths of the slots 42, 44 correspond to the diameters of the shanks of the respective eyebolts 16, 28.

Figures 4, 5:
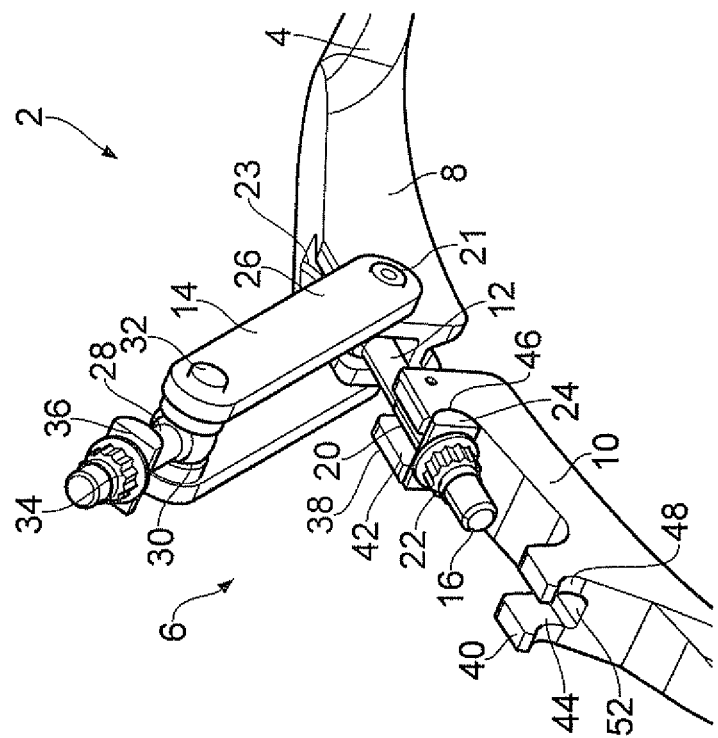
FIG. 4 is a partial perspective view of the circumferential clamp shown in FIG. 1 in showing the latching assembly unlatched.
FIG. 5 is a partial perspective view of the circumferential clamp shown in FIG. 1 showing the latching assembly partially latched.

As shown in FIG. 4, each engaging portion 38, 40 has concave bearing surfaces 46, 48 on either side of the slots 42, 44. The concave bearing surfaces 38, 40 face away from the second circumferential end 10. The concave bearing surfaces 46, 48 define first and second seats 50, 52 which receive the concave surfaces of the respective cylindrical washers 24, 36 of the first and second latching devices 12, 14.

Figure 6:
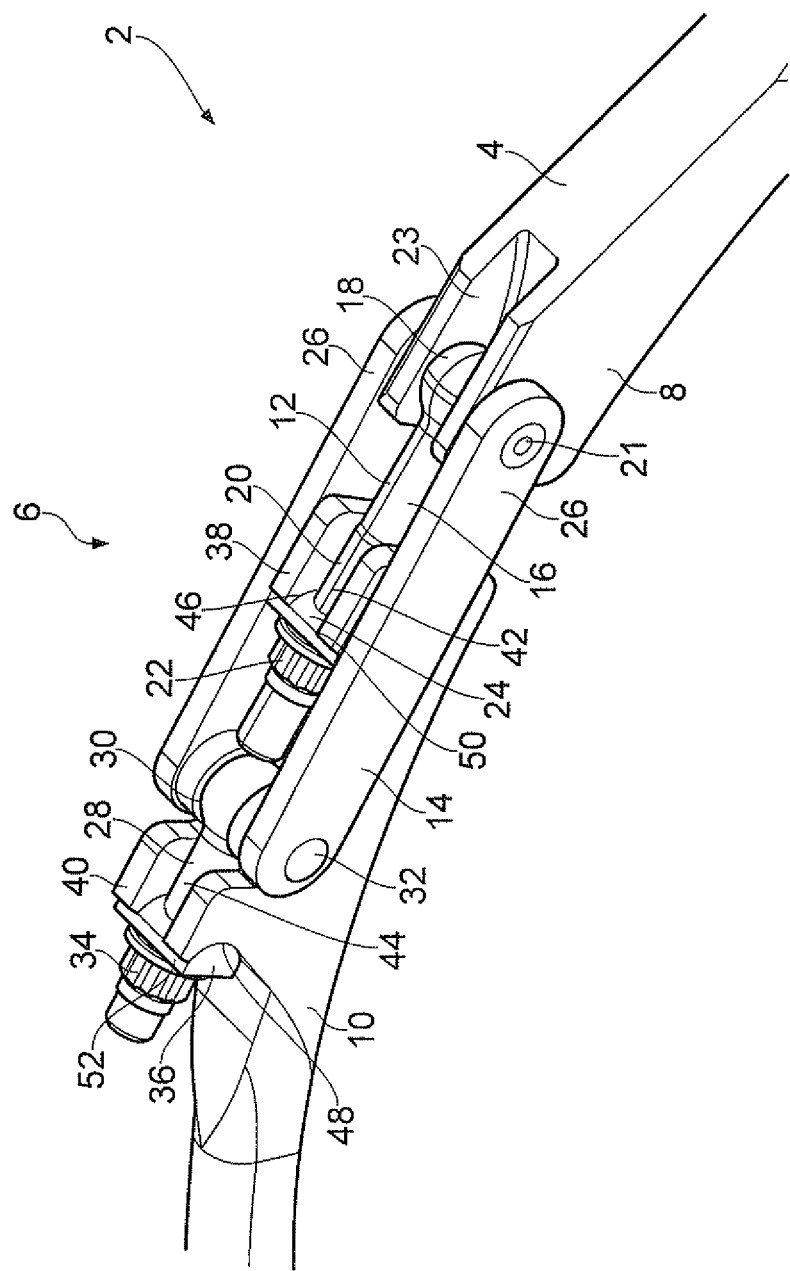
FIG. 6 is a partial perspective view of the circumferential clamp shown in FIG. 1 showing the latching assembly fully latched.

Latching of the circumferential clamp 2 is described as follows with reference to FIGS. 4 to 6.

FIG. 4 shows the latching assembly 6 unlatched. Both the first and second latching devices 12, 14 are disengaged from the second circumferential end 10 and are shown pivoted outwardly away from the clamping band 4. The threaded fasteners 22, 34 are wound along the threaded sections 20, 32 of the eyebolts 16, 28 away from the eyes 18, 30 so as to allow the threaded fasteners 22, 34 and respective semi-cylindrical washers 24, 36 to clear the engaging portions 38, 40 when pivoted into a latching position.

The latching assembly 6 is partially latched by pivoting the first latching device 12 towards the second circumferential end 10 of the clamping band 4. The threaded fastener 22 and the semi-cylindrical washer 24 pass over the first engaging portion 38 so that the shank of the eyebolt 16 lies along the slot 42 through the first engaging portion 38. The lengthwise axis of the first latching device 12 is tangential to the clamping band 4. A socket is then placed over the threaded fastener 22 and used to wind the fastener 22 along the threaded section 20 towards the eye 18 thereby tightening the threaded fastener 22 and the semi-cylindrical washer 24 against the first seat 50.

The first latching device 14 thus secures the first and second circumferential ends 10 together. The threaded fastener 22 is tightened to clamp the clamping ring 4. The latching assembly 6 is shown in FIG. 5 with the first latching device 12 securing the first and second circumferential ends 8, 10 together.

Once the first latching device 12 has been latched, the second latching device 14 is pivoted towards the second circumferential end 10 of the clamping band 4. The threaded fastener 34 and the semi-cylindrical washer 36 pass over the second engaging portion 40 so that the shank of the second eyebolt 28 lies along the slot 44 through the second engaging portion 40. The links 26 extend each side of the first latching device 12 and each side of the first engaging portion 38. The lengthwise axis of the second latching device 14 is tangential to the clamping band 4 and intersects the lengthwise axis of the first latching device 12. The angle of intersection is small, for example between 0 and 20 degrees, and preferably no greater than 10 degrees, for example no greater than 5 degrees. The lengthwise axes of the first and second latching devices 12, 14 may be coincident. Thus, the lengthwise axes of the first and second latching devices 12, 14 lie in, or intersect, a common plane which is tangential to the clamping band 4. The first latching device 12 is disposed between the links 26 and the eye-end of the second eyebolt 28 obstructs access to the end of the second eyebolt 28, A socket is placed over the threaded fastener 22 and used to wind the threaded fastener 34 along the threaded section 20 of the second eyebolt 28 to tighten the threaded fastener 34 and the semi-cylindrical washer 36 against the second seat 52. The second latching device 14 thus further secures the first and second circumferential ends 8, 10 together. The latching assembly 6 is shown in FIG. 6 with the first and second latching devices 12, 14 securing the first and second circumferential ends 8, 10 together. This configuration is the same as that shown in FIG. 1.

Coincident, or intersecting, lengthwise axes of the first and second latching devices 12, 14 ensure that both latching devices 12, 14 act through substantially the same point on the clamping band 4, thereby reducing the difference in bending moment generated by each of the latching devices 12, 14. Furthermore, by nesting the first latching device 12 within the second latching device 14, the amount of radial space occupied by the latching assembly 6 is reduced. Consequently, the size of the portion of the clamping band 4 to which the latching devices 12, 14 latch is reduced thereby reducing the weight of the clamping band 4.

Once the second latching device 14 has been latched, access to the threaded fastener 22 is obstructed by the links 26 of the second latching device 14 and the end of the second eyebolt 28 which is secured to the links 26. Consequently, when both latching devices 12, 14 are latched it is not possible to place a socket over the threaded fastener 22 of the first latching device 12 in order to further tighten the fastener 22. This is particularly advantageous for latching devices which must be fastened in a predetermined sequence, for example when the first latching device 12 is a redundant latching device which should not be tightened after the second latching device has been tightened.

It will be appreciated that the latching devices 12, 14 may be arranged adjacent to each other so that the lengthwise axes of the latching devices 12, 14 extend in the same plane which is tangential to the clamping band 4 but do not intersect and are not coincident. This would reduce the radial space occupied by the latching devices 12, 14 compared with radially spaced latching devices.

More than one latching device 6 may be provided about the clamping band 4. These may be angularly offset from each other about the longitudinal axis of the clamping band 4.

The circumferential clamp may, for example, comprise a V-coupling in accordance with SAE AS1895. Failsafe links may also be incorporated. These may be disposed between each of the threaded fasteners 22, 34 and the cylindrical washers 24, 36.

A variant of the described embodiments comprises links 26 pivotally connected to the first circumferential end 8 of the clamping band 4 by a separate clevis arrangement. Separate devises provide redundancy in the event of failure of one of the devises and can be used to provide a separate pivot for the second latching device 14.

The pivot of the second latching device 14 may be disposed fore or aft of the pivot of the first latching device 12. The first and second latching devices 12, 14 may be pivotally connected to opposite ends of the clamping band 4, the respective engaging portions 38, 40 being formed on the respective other ends of the clamping band 4.

It will be appreciated that although the latching assembly has been described as being used to secure ends of a clamping band together, the latching assembly would be suitable for latching other types of components together, particularly where a compact latch is required or where over-stressing through alternate re-tightening of latching devices is to be avoided.

The invention claimed is:

1. A circumferential clamp, comprising:
   a clamping band having oppositely disposed circumferential ends; and
   a latching assembly for securing the ends together, the latching assembly including first and second latching devices, each of the latching devices including a threaded fastener and an elongate element which is pivotably mounted on the clamping band adjacent one of the ends and is engageable with the clamping band adjacent the other end to latch the ends together, the lengthwise axes of the elongate elements lying in, or intersecting, a common plane tangential to the clamping band, and the lengthwise axes are coincident with, or intersect, each other, wherein the elongate elements of the first and second latching devices are mounted on the clamping band to independently pivot about a common axis, and the second latching device obstructs access to the threaded fastener of the first latching device when the ends of the clamping band are latched together by the first and second latching devices.

2. A circumferential clamp as claimed in claim 1, wherein the second latching device comprises at least one linkage which is offset from the lengthwise axis of the second latching device so as to accommodate the first latching device.

3. A circumferential clamp as claimed in claim 2, wherein the or each linkage comprises a plurality of stacked plate links, each plate link extending parallel to the lengthwise axis of the second latching device.

4. A circumferential clamp as claimed in claim 3, wherein the first latching device is disposed between the plate links of the linkage when the ends of the clamping band are latched together by the first and second latching devices.

5. A latching assembly for securing two components together using a clamping band, the latching assembly comprising:
   first and second latching devices, each of the latching devices including a threaded fastener and an elongate element which is pivotably mounted to one of the components and is engagable with the other component to latch the components together, the lengthwise axes of the elongate elements being coincident with, or intersecting, each other,
   wherein the elongate elements of the first and second latching devices are mounted on the clamping band to independently pivot about a common axis and the second latching device obstructs access to the threaded fastener of the first latching device when the ends of the clamping band are latched together by the first and second latching devices.

\* \* \* \* \*